US009409640B2

(12) United States Patent
Shimazaki (10) Patent No.: US 9,409,640 B2
(45) Date of Patent: Aug. 9, 2016

(54) DECELERATING AND REVERSING DEVICE FOR MARINE VESSEL

(71) Applicant: YANMAR CO., LTD., Osaka (JP)

(72) Inventor: Keisei Shimazaki, Hyogo (JP)

(73) Assignee: YANMAR CO., LTD., Osaka (JP)

( * ) Notice: Subject to any disclaimer, the term of this patent is extended or adjusted under 35 U.S.C. 154(b) by 78 days.

(21) Appl. No.: 14/365,823

(22) PCT Filed: Dec. 12, 2012

(86) PCT No.: PCT/JP2012/082180
§ 371 (c)(1),
(2) Date: Jun. 16, 2014

(87) PCT Pub. No.: WO2013/089133
PCT Pub. Date: Jun. 20, 2013

(65) Prior Publication Data
US 2015/0068331 A1    Mar. 12, 2015

(30) Foreign Application Priority Data

Dec. 14, 2011    (JP) ................................ 2011-273485

(51) Int. Cl.
| F16H 3/16 | (2006.01) |
| B63J 3/02 | (2006.01) |
| B63H 23/30 | (2006.01) |
| B63H 23/08 | (2006.01) |
| B63H 5/07 | (2006.01) |

(Continued)

(52) U.S. Cl.
CPC ... *B63J 3/02* (2013.01); *B63H 5/07* (2013.01); *B63H 23/08* (2013.01); *B63H 23/30* (2013.01); *B63J 2003/005* (2013.01); *F16H 3/14* (2013.01)

(58) Field of Classification Search
CPC .............. F16H 3/14; B63J 3/02; B63H 23/08; B63H 23/30
USPC ......................................................... 74/15.66
See application file for complete search history.

(56) References Cited

U.S. PATENT DOCUMENTS 4,451,238 A * 5/1984 Arnold .................... B63H 23/32
                                                  192/219
4,546,661 A * 10/1985 Weis ......................... F16H 3/14
                                                  74/15.4

(Continued)

FOREIGN PATENT DOCUMENTS

| JP | 63-116995 A | 5/1988 |
| JP | 2002-096796 A | 4/2002 |
| JP | 2010-12832 A | 1/2010 |

OTHER PUBLICATIONS

Misao et al., Speed-Reducing Reversing Gear for Ship, Apr. 2, 2002, JPO, JP 2002-096796 A, Machine Translation of Description.*

(Continued)

*Primary Examiner* — James English
(74) *Attorney, Agent, or Firm* — Cantor Colburn LLP (57) ABSTRACT

A forward input gear, a backward input gear, a forward clutch, a backward clutch, and a PTO transmission unit for extracting motive power are contiguously arranged in the cover width direction in a case cover, and the PTO transmission unit is constituted by a PTO gear meshed with the forward input gear, and a PTO shaft on which the PTO gear is fixedly disposed in the middle of the shaft, and the PTO shaft is detachably and rotatably supported between a second case and the case cover.

3 Claims, 7 Drawing Sheets

(51) Int. Cl.
   *F16H 3/14*    (2006.01)
   *B63J 3/00*    (2006.01)

(56) References Cited

U.S. PATENT DOCUMENTS

| | | | | |
|---|---|---|---|---|
| 5,570,605 | A * | 11/1996 | Kitagawara | F16H 37/043 74/15.63 |
| 6,360,623 | B1 * | 3/2002 | Matsufuji | F16H 37/043 74/15.66 |
| 7,735,394 | B2 * | 6/2010 | Yamaguchi | F16H 57/029 74/606 R |
| 2004/0206078 | A1 * | 10/2004 | Ito | F16H 39/14 60/487 |
| 2006/0107660 | A1 * | 5/2006 | Kawamura | F04B 1/22 60/413 |
| 2007/0157751 | A1 * | 7/2007 | Woehrle | B60N 2/067 74/27 |
| 2008/0214348 | A1 * | 9/2008 | Hasegawa | F16H 37/043 475/80 |
| 2011/0086739 | A1 * | 4/2011 | Kajigai | B60K 6/26 477/5 |
| 2014/0123792 | A1 * | 5/2014 | Sakurai | F16H 3/14 74/331 |
| 2015/0114154 | A1 * | 4/2015 | Terasawa | B63H 23/30 74/404 |

OTHER PUBLICATIONS

International Search Report for International Application No. PCT/JP2012/082180; date of mailing, Mar. 19, 2013 with English Translation.

* cited by examiner

DECELERATING AND REVERSING DEVICE FOR MARINE VESSEL

CROSS REFERENCE TO RELATED APPLICATIONS

This is the U.S. national stage of application No. PCT/JP2012/082180, filed on 12 Dec. 2012. Priority under 35 U.S.C. §119(a) and 35 U.S.C. §365(b) is claimed from Japanese Application No. 2011-273485, filed 14 Dec. 2011, the disclosure of which is also incorporated herein by reference.

TECHNICAL FIELD

The present invention relates to a decelerating and reversing device for marine vessels, wherein a first case, a second case, and a case cover detachable with the second case are aligned in order from one side to the other side of an axial direction of an input shaft with respect to the device in such a manner as to form a housing, and forward and backward propulsion transmission units are stored in the housing, and any of the propulsion transmission units comprises a pinion configured to mesh with an output gear coupled with a propeller, the input shaft configured to be freely fitted with the pinion in a middle thereof, an input gear configured to be fixedly disposed on the other side of the input shaft, and a clutch configured to be interposed between the input gear and the pinion in such a manner as to connect and disconnect motive power, and in particular relates to a constitution in which a PTO transmission unit is mounted on the decelerating and reversing device for marine vessels.

BACKGROUND ART

Conventionally, a decelerating and reversing device for marine vessels, which propels and drives the marine vessel, is equipped with various auxiliary instruments such as a generator. A PTO transmission unit for extracting motive power is provided at an upper portion of a housing or at a periphery of an output shaft of the decelerating and reversing device for marine vessels, which causes an increase in the whole size of the decelerating and reversing device for marine vessels.

Accordingly, there has been known a technology in which a hole portion in which the PTO shaft of the PTO transmission unit is attached is formed, in addition to a hole portion in which each input shaft of forward and backward propulsion transmission units is attached in the interior of the housing, thereby storing the PTO transmission unit in the housing and achieving reduction in the whole size of the decelerating and reversing device for marine vessels (for example, see Patent Literature 1).

However, in the above-mentioned technology, the PTO transmission unit is arranged in the housing where accessibility from the outside is limited, and it is necessary to disassemble the housing each time the PTO transmission unit is attached and detached, or replaced due to the maintenance or change of specifications, which fails to provide a high degree of maintainability and exchangeability in terms of the attachment and detachment of the PTO transmission unit.

In view of this, it is conceivable that the housing is constituted by a plurality of case members, and the PTO transmission unit is stored in a member detachably disposed from the outside (hereinafter, referred to as "case cover"), out of the case members, thereby improving maintainability and versatility of the PTO transmission unit.

PTL 1: Japanese Unexamined Patent Application Publication No. 1988-116995

SUMMARY OF INVENTION

Technical Problem

However, based on the above-mentioned treatment, there is a problem in that, although the maintainability and exchangeability in terms of the attachment and detachment of the PTO transmission unit are improved, the size of the housing is increased by the volume in which the PTO transmission unit is stored in the case cover, and the increase in the whole size of the decelerating and reversing device for marine vessels cannot be prevented as before.

Moreover, notwithstanding that clutches or input gears, for which torque is substantially changed due to the engagement and disengagement of the clutch, are most severely damaged in the propulsion transmission unit, and that maintenance is required as regular intervals, the clutches or input gears are still stored in the case member where accessibility from the outside is limited as before. Accordingly, there is a problem in that it is necessary to disassemble the housing for every maintenance, which is inferior in terms of the maintainability of the propulsion transmission unit.

Solution to Problem

The first aspect of the present invention is characterized in that a decelerating and reversing device for marine vessels, is such that a first case, a second case, and a case cover detachable with the second case are aligned in order from one side to other side of an axial direction of an input shaft with respect to the device in such a manner as to form a housing, and forward and backward propulsion transmission units are stored in the housing, and any of the propulsion transmission units comprises a pinion configured to mesh with an output gear coupled with a propeller, the input shaft configured to be freely fitted with the pinion in a middle thereof, an input gear configured to be fixedly disposed on other side of the input shaft, and a clutch configured to be interposed between the input gear and the pinion in such a manner as to connect and disconnect motive power, the decelerating and reversing device for marine vessels is such that, wherein the input gear, the clutch, and a PTO transmission unit for extracting the motive power are contiguously arranged in a cover width direction in the case cover, and wherein the PTO transmission unit comprises a PTO gear configured to mesh with the input gear; and a PTO shaft on which the PTO gear is fixedly disposed in a middle of the PTO shaft, and wherein the PTO shaft is detachably and rotatably supported between a bearing of the second case and a bearing of the case cover, both of which are facing each other.

The second aspect of the present invention is such that a PTO clutch that connects and disconnects the motive power is interposed between the PTO gear and the PTO shaft of the PTO transmission unit, and the PTO shaft is coupled with a generator in such a manner as to work together via a connecting structure detachably provided on an external side surface of the case cover, and there is provided a control constitution in which, when a charge of electricity to a battery which accumulates electric power from the generator is completed, disengagement of the PTO clutch is set.

Advantageous Effects of Invention

With the above-mentioned constitution, the present invention has advantageous effects described below. That is, according to the first aspect of the present invention, only the detachment of the case cover allows easy access from the outside to the input gears and the clutches of the propulsion transmission unit and the PTO transmission unit, thereby improving maintainability and exchangeability in terms of the attachment and detachment of the input gears, the clutches, and the PTO transmission unit. Furthermore, out of the constituent components of the propulsion transmission units, the clutches that occupy a substantially large space in the housing are arranged without a gap on the lateral side of the PTO transmission unit in the case cover, and an increase in volume of the case cover due to the storage of the clutches is restrained, so that the volume of the first case and the second case, which are portions made up of the housing except for the case cover, can be reduced by the eliminated volume of the clutches, and accordingly, the size of the housing is reduced, thereby achieving reduction in the whole size of the decelerating and reversing device for marine vessels. Additionally, the PTO shaft can support the housing by use of constituent members of the housing, so that it is not necessary to separately provide a supporting member and newly mount it in the case cover, whereby reduction in the component cost can be achieved, and an increase in the volume of the case cover is restrained, and whereby further reduction in the whole size of the decelerating and reversing device for marine vessels can be achieved.

According to the second aspect of the present invention, the motive power from the engine can be prevented from being consumed in a wasteful manner for the purpose of the drive of the generator, and the battery can be prevented from being overcharged, and the improvement of fuel consumption, which is attributed to reduction in the power loss, and the improvement of the life of the generator and the battery, which is the associated instrument of the generator, can be achieved.

DESCRIPTION OF EMBODIMENTS

Figure 1:
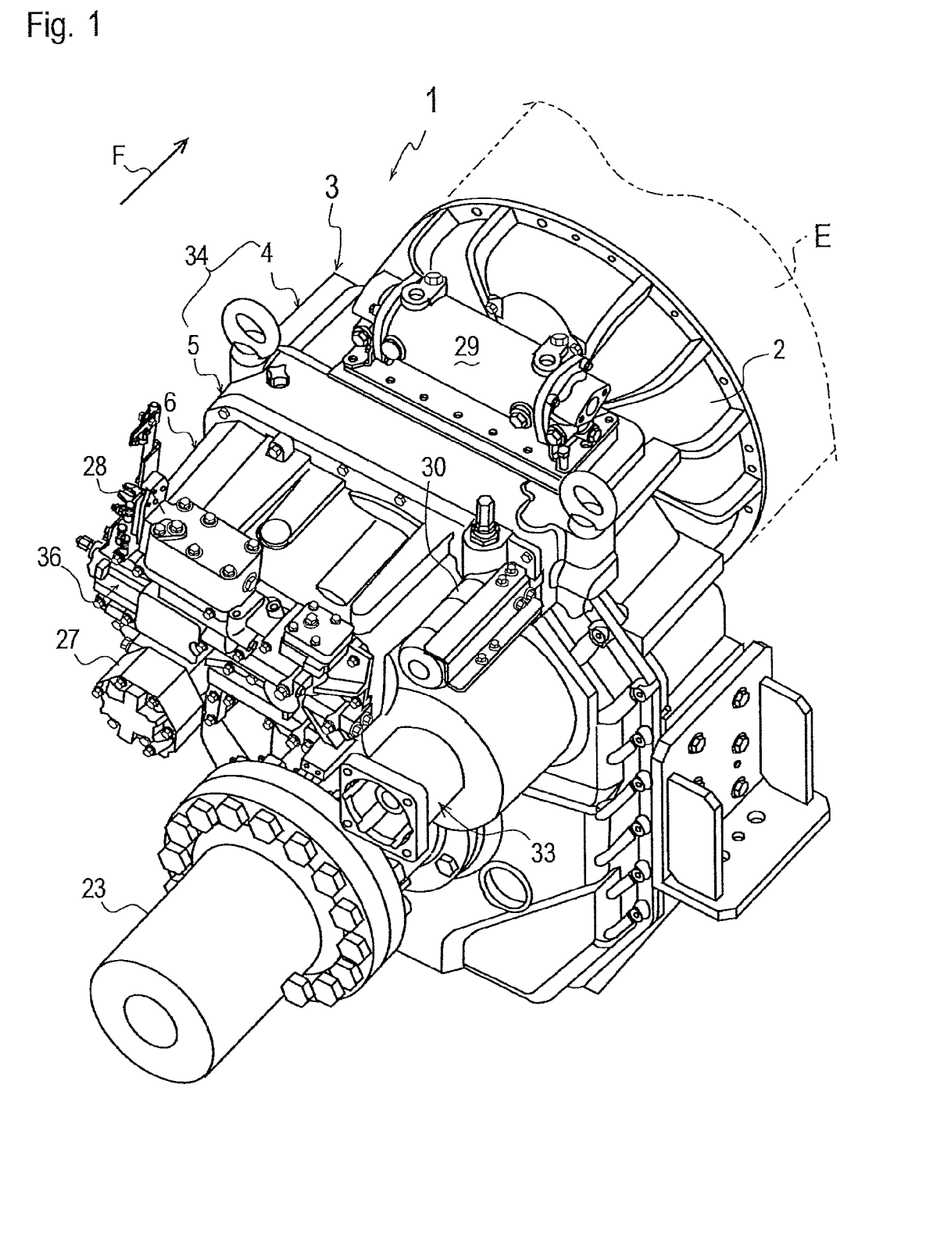
FIG. 1 is a perspective view illustrating the whole constitution of a decelerating and reversing device for marine vessels, viewed obliquely backward to the right, according to the present invention.

Hereinafter, the embodiment of the present invention will be described. It is noted that the direction illustrated by an arrow F in FIG. 1 is regarded as the forward direction of a vessel not illustrated, in which a decelerating and reversing device 1 for marine vessels is mounted, and the forward direction serves as a standard for the position and direction of each member described below.

First, the entire constitution of the decelerating and reversing device 1 for marine vessels according to the present invention will be described referring to FIGS. 1 to 4. The decelerating and reversing device 1 for marine vessels includes a housing 3 attached on a rear end portion of a main body 2 of the hull of the vessel, and the housing 3 stores a forward transmission unit 7 that outputs motive power from an engine E, as deceleration power decelerated in the forward direction (hereinafter referred to as "forward power"), a backward transmission unit 8 that outputs the motive power from the engine as the deceleration power (hereinafter, referred to as "backward power") that rotates in the opposite direction with respect to the forward power, an output transmission unit 9 that outputs the motive power from one of the forward transmission unit 7 and the backward transmission unit 8 to the propeller of the vessel, and a PTO transmission unit 10 according to the present invention, which outputs the motive power to auxiliary instruments such as a generator not illustrated.

Then, the engine E and a flywheel 11 coupled with the engine E are stored in the main body 2 of the hull, and the flywheel 11 is coupled with the front end of a forward input shaft 12 of the forward transmission unit 7.

Accordingly, the motive power from the engine E is always inputted to the forward input shaft 12, and when the vessel moves forward, the forward transmission unit 7 is coupled with the output transmission unit 9 as it is by means of clutches 14 and 18 described in detail later, and the forward power is transmitted to the propeller, whereas when the vessel moves backward, the forward transmission unit 7 is coupled with the output transmission unit 9 via the backward transmission unit 8 by means of the clutches 14 and 18, and the backward power is transmitted to the propeller. Furthermore, the forward transmission unit 7 is always coupled with the PTO transmission unit 10, and the forward power is transmitted to the external auxiliary instruments via the PTO transmission unit 10.

Figure 2:
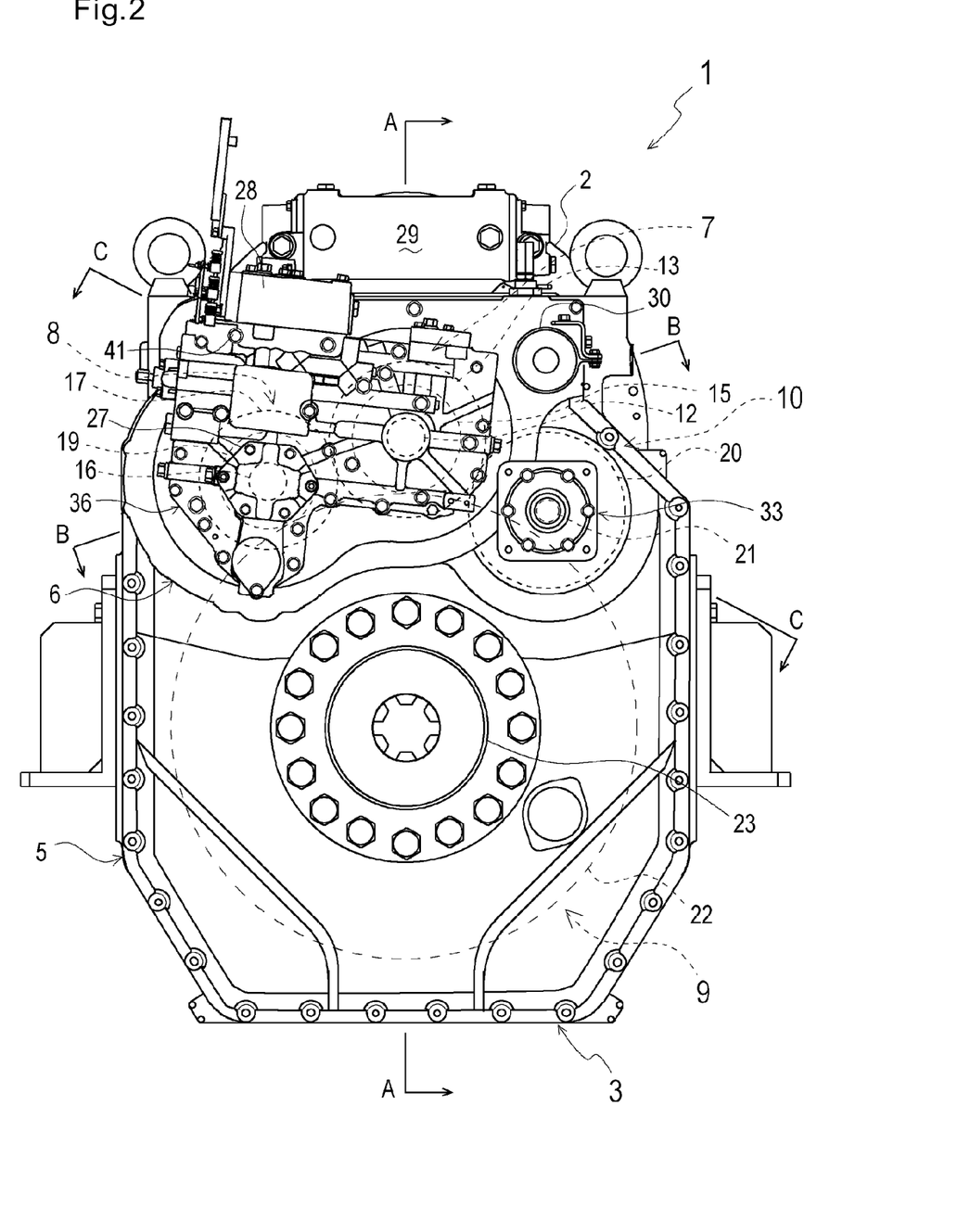
FIG. 2 is a back view of the same.

Also, an oil cooler 29 is placed and fixed on the upper surface of the housing 3, and an oil filter 30 is disposed on the right upper portion on a back surface of the housing 3, and a forward-backward switching valve 28 and a hydraulic pump 27 are disposed at the upper and lower positions of the left portion on the back surface of the housing 3 via a cover plate 36 described later.

Accordingly, when the hydraulic pump 27 is driven, hydraulic oil, which is sucked from an oil reservoir in the housing 3 and filtered through a suction filter not illustrated, is supplied to the transmission units 7 and 8 via the forward-backward switching valve 28, an oil path 31, and the like. Furthermore, after being cooled by the oil cooler 29 and filtered through the oil filter 30, part of the hydraulic oil is supplied to the transmission units 7 to 10 as lubricating oil.

Figure 3:
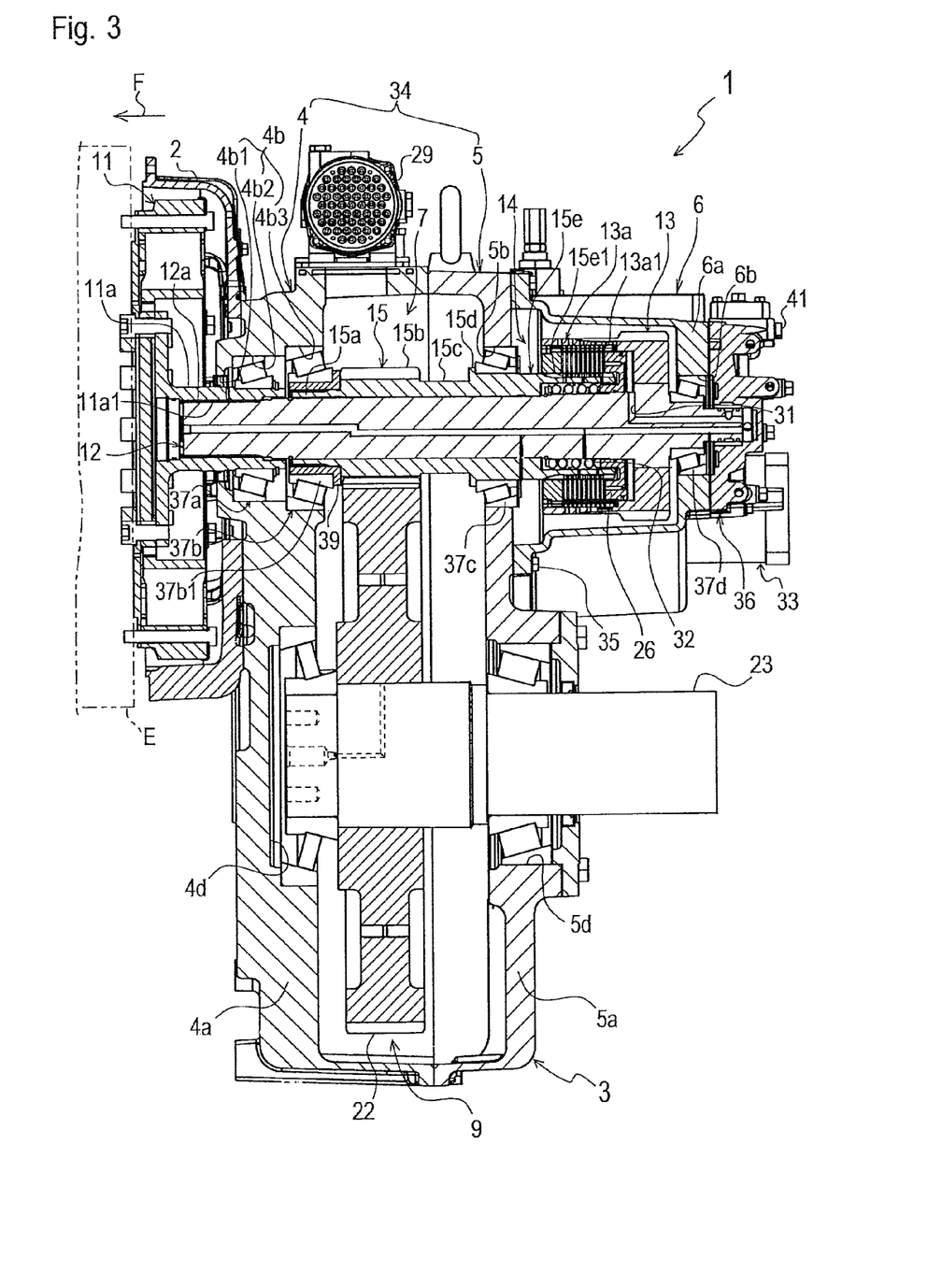
FIG. 3 is a cross-sectional view taken along the line A-A of FIG. 2.

Next, the forward-backward switching constitution of the decelerating and reversing device 1 for marine vessels will be described referring to FIGS. 2 to 4. As illustrated in FIG. 3, the forward transmission unit 7 is constituted by the forward input shaft 12, a forward input gear 13 that is externally fitted and fixedly installed on the rear end of the forward input shaft 12, a forward pinion 15 that is freely fitted in the middle between the front and the back of the forward input shaft 12, and a forward clutch 14 disposed between the forward pinion 15 and the forward input gear 13.

The forward clutch 14 is a multiplate wet clutch, which includes an inner drum 15e formed on the rear end portion of the forward pinion 15 and an outer drum 13a integrally formed with the forward input gear 13, and a plurality of clutch discs 15e1 that are fixedly disposed on the inner drum 15e are alternately arranged in gaps between a plurality of pressure plates 13a1 that are fixedly disposed on the outer drum 13a.

Furthermore, a hydraulic piston 26 is arranged on the inner side of the forward input gear 13, and the hydraulic oil is supplied to the hydraulic piston 26, and the hydraulic piston 26 is pressed forward by the hydraulic pressure of the hydraulic oil, whereby the pressure plates 13a1 and the clutch discs 15e1 are pressure contacted with each other against the elastic force of a return spring 32 wound around the external circumference of the forward input shaft 12 in the inner drum 15e. Then, the outer drum 13a and the inner drum 15e are coupled via the pressure plates 13a1 and the clutch discs 15e1, and the forward clutch 14 is "engaged", which allows the forward pinion 15 to be coupled with the forward input shaft 12.

Conversely, when the hydraulic oil is not supplied to the hydraulic piston 26, the hydraulic piston 26 is pressed backward by the elastic force of the return spring 32, whereby the pressure plates 13a1 and the clutch discs 15e1 are detached from each other. Then, the coupling between the outer drum 13a and the inner drum 15e is severed, and the forward clutch 14 is "disengaged", and the forward pinion 15 and the forward input shaft 12 are disconnected.

Figure 4:
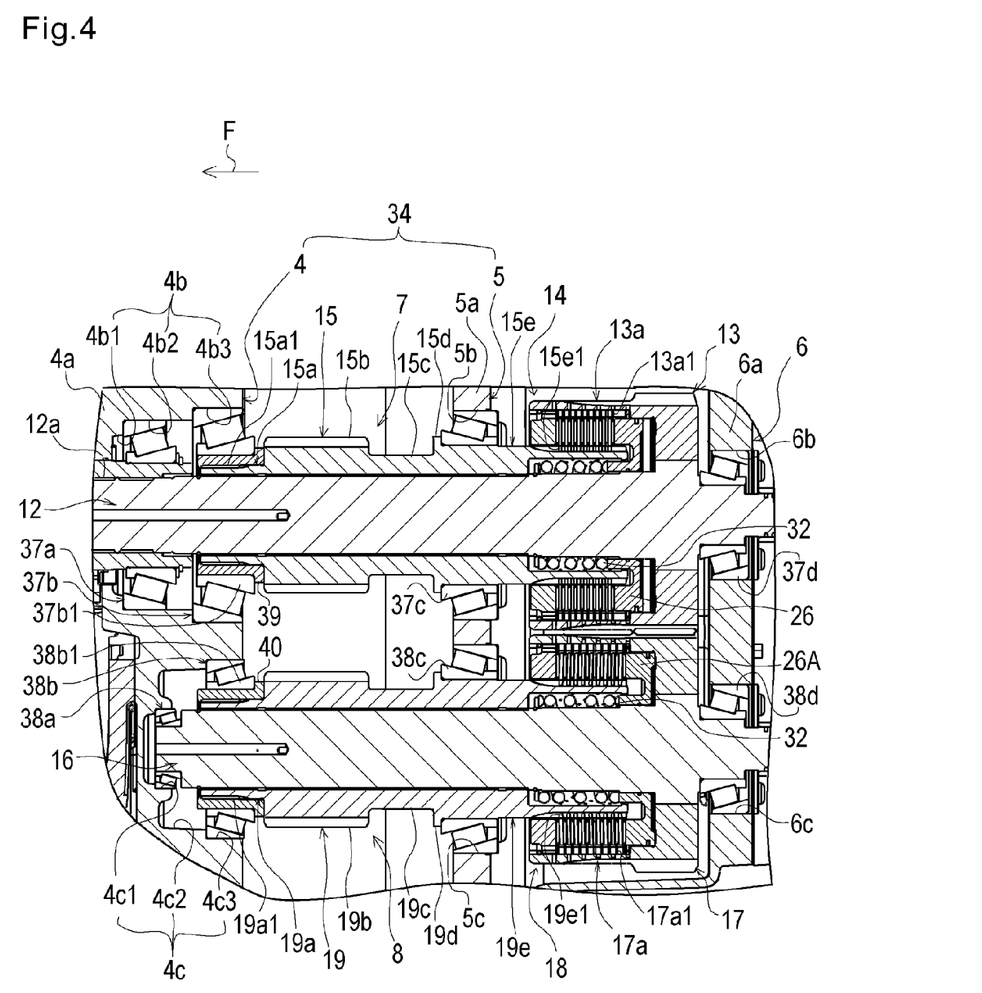
FIG. 4 is a cross-sectional view taken along the line B-B of FIG. 2.

As illustrated in FIG. 4, the backward transmission unit 8, as is the same case with the forward transmission unit 7, is constituted by a backward input shaft 16 parallel to the forward input shaft 12, a backward input gear 17 that is externally fitted and fixedly installed on the rear end of the backward input shaft 16, a backward pinion 19 that is freely fitted in the middle between the front and the back of the backward input shaft 16, and a backward clutch 18 disposed between the backward pinion 19 and the backward input gear 17.

The backward clutch 18 is also a multiplate wet clutch, and as is the same case with the forward clutch 14, the clutch disc 19e1 of an inner drum 19e and the pressure plate 17a1 of an outer drum 17a are alternately arranged, and a hydraulic piston 26A is arranged on the inner side of the backward input gear 17.

Accordingly, when the hydraulic piston 26A is pressed forward by the hydraulic oil, the backward clutch 18 is "engaged", and the backward pinion 19 is coupled with the backward input gear 17 via the backward clutch 18. Conversely, when the hydraulic oil is not supplied to the hydraulic piston 26A, the hydraulic piston 26A is pressed backward by the return spring 32, and the backward clutch 18 is "disengaged", and the backward pinion 19 and the backward input gear 17 are disconnected.

Furthermore, as illustrated in FIG. 2, the backward transmission unit 8 is adjacently arranged obliquely downward to the left of the forward transmission unit 7, and the backward input gear 17 of the backward transmission unit 8 is always meshed with the forward input gear 13 of the forward transmission unit 7, and the backward input gear 17 is always driven by the motive power which is transmitted from the forward input shaft 12 to the forward input gear 13.

As illustrated in FIG. 3, the output transmission unit 9 is constituted by an output shaft 23 that is parallel to the forward input shaft 12 and connected to the propeller and an output gear 22 that is externally fitted and fixedly installed on the front portion of the output shaft 23. The output gear 22 is always meshed with the forward pinion 15 of the forward transmission unit 7 and the backward pinion 19 of the backward transmission unit 8.

In this case, the output gear 22 is larger in diameter than the pinions 15 and 19, so that forward decelerating gear trains 15 and 22 are formed between the forward transmission unit 7 and the output transmission unit 9, and backward decelerating gear trains 19 and 22 are formed between the backward transmission unit 8 and the output transmission unit 9.

The forward-backward switching procedure of the switching mechanism described above will be described. When the forward-backward switching valve 28 is in a neutral position, the hydraulic oil is not supplied to any of the hydraulic piston 26 of the forward transmission unit 7 and the hydraulic piston 26A of the backward transmission unit 8, and both the forward clutch 14 and the backward clutch 18 are "disengaged".

In this case, the forward input shaft 12 and the forward input gear 13 are integrally rotated by the motive power of the engine E, and the backward input shaft 16 and the backward input gear 17 meshed with the forward input gear 13 are integrally rotated. However, any of the forward pinion 15 and the backward pinion 19 falls in a racing state with respect to the forward input shaft 12 and the backward input shaft 16, and the motive power is not transmitted to the output gear 22 with which the forward pinion 15 and the backward pinion 19 are simultaneously meshed.

Then, when the forward-backward switching valve 28 is switched to the forward position, the hydraulic oil pressure-transmitted through the hydraulic pump 27 is supplied to the hydraulic piston 26 of the forward transmission unit 7, whereas the hydraulic oil is not supplied to the hydraulic piston 26A of the backward transmission unit 8, and only the forward clutch 14 is "engaged".

In this case, the forward pinion 15 is coupled with the forward input shaft 12 via the forward clutch 14, and the motive power from the engine E is transmitted from the forward input shaft 12 to the output shaft 23 via the forward decelerating gear trains 15 and 22, and the propeller coupled with the output shaft 23 is driven by the forward power. In contrast, the backward pinion 19 is in a racing state with respect to the backward input shaft 16, and the motive power is not transmitted from the backward pinion 19 to the output shaft 23.

Alternatively, when the forward-backward switching valve 28 is switched to the backward position, the hydraulic oil is supplied to the hydraulic piston 26A of the backward transmission unit 8, whereas the hydraulic oil is not supplied to the hydraulic piston 26 of the forward transmission unit 7, and only the backward clutch 18 is "engaged".

In this case, the backward pinion 19 is coupled with the backward input gear 17 via the backward clutch 18, and the motive power from the engine E is transmitted from the forward input shaft 12, the forward input gear 13, the backward input gear 17, and the backward clutch 18 to the output shaft 23 via the backward decelerating gear trains 19 and 22, and the propeller coupled with the output shaft 23 is driven by the backward power. In the meantime, the forward pinion 15 is in a racing state with respect to the forward input shaft 12, and the motive power is not transmitted from the forward pinion 15 to the output shaft 23.

Next, an extraction constitution from the housing 3 of the transmission units 7 and 8 will be described referring to FIGS. 2 to 5. The housing 3 is constituted by a case body 34 formed in a half-split shape halved back and front and made up of a first case 4 and a second case 5, and a case cover 6 that is detachably fastened and fixed by a plurality of bolts 35 on the upper half portion of a back wall 5a of the second case 5.

Regarding the first case 4 out of these cases, a multistage first forward shaft hole 4b is bored in the back-and-forth direction on the upper portion of the front wall 4a that blocks the front surface thereof, and the first forward shaft hole 4b is constituted by a small diameter portion 4b1, a middle diameter portion 4b2, and a large diameter portion 4b3, each of which is formed in such a manner as to expand the diameter in order from the front on the same axis. Furthermore, a multistage first backward shaft concave portion 4c that is depressed forward is formed at a position obliquely downward to the left of the first forward shaft hole 4b in back view. The first backward shaft concave portion 4c is constituted by a small diameter portion 4c1, a middle diameter portion 4c2, and a large diameter portion 4c3, each of which is formed in such a manner as to expand the diameter in order from the front on the same axis. Additionally, a first output shaft concave portion 4d that is depressed forward is formed immediately below the first forward shaft hole 4b in back view.

Regarding the second case 5, on the back wall 5a that blocks the back surface thereof, a second forward shaft hole 5b, a second backward shaft hole 5c, and a second output shaft hole 5d are respectively bored at positions immediately behind the first forward shaft hole 4b, the first backward shaft concave portion 4c, and the first output shaft concave portion 4d.

Regarding the case cover 6, on a cover wall 6a that blocks the back surface thereof, a cover forward shaft hole 6b and a cover backward shaft hole 6c are respectively bored at positions immediately behind the second forward shaft hole 5b and the second backward shaft hole Sc.

Furthermore, on the cover wall 6a of the case cover 6, the cover plate 36 is detachably disposed in such a manner as to be covered by means of a plurality of bolts 41, and a hydraulic circuit to supply/discharge the lubricating oil to/from the transmission units 7 to 10 or the hydraulic oil to/from the clutches 14 and 18 is formed in the interior of the cover plate 36.

Regarding the housing 3 having the above-mentioned constitution, a spline portion 12a is provided at the tip end of the forward input shaft 12 in the forward transmission unit 7, and the spline portion 12a is relatively unrotatably fitted and slidably inserted in the axial direction into the spline hole 11a1 of a connecting portion 11a provided in the flywheel 11. Furthermore, the connecting portion 11a is extended backward from the small diameter portion 4b1 to the middle diameter portion 4b2 in the first forward shaft hole 4b of the first case 4 and rotatably supported by the middle diameter portion 4b2 via a machine-body-side taper roller bearing 37a.

Herein, regarding the forward pinion 15 that is freely fitted into the forward input shaft 12, an insertion cylindrical portion 15a, whose diameter is smaller than that of a tooth portion 15b, and a shaft body 15c are formed, with the tooth portion 15b sandwiched back and forth, and the inner drum 15e is contiguously disposed at the back of the shaft body 15c.

The insertion cylindrical portion 15a is rotatably supported by the large diameter portion 4b3 of the first forward shaft hole 4b of the first case 4 via a first taper roller bearing 37b and a sleeve 39. The sleeve 39 is formed in a ring shape, and the outer circumferential surface of the sleeve 39 is adhered and fixed to the inner ring 37b1 of the first taper roller bearing 37b, whereas the insertion cylindrical portion 15a is relatively unrotatably fitted and slidably inserted in the axial direction into the inner circumferential surface of the sleeve 39. Then, in the present embodiment, a spline 15a1 is provided on the outer circumferential surface of the insertion cylindrical portion 15a, thereby reducing frictional resistance in the axial direction between the outer circumferential surface of the insertion cylindrical portion 15a and the inner circumferential surface of the sleeve 39.

Furthermore, the inner drum 15e is rotatably supported by the second forward shaft hole 5b of the second case 5 via a second taper roller bearing 37c. It is noted that a ring-shaped collar portion 15d that protrudes on the external side in the radial direction is provided between the shaft body 15c and the inner drum 15e, and the sliding of the second taper roller bearing 37c in the forward direction is regulated by the collar portion 15d.

The forward input shaft 12 is extended further backward with respect to the forward pinion 15, and the extended end of the forward input shaft 12 penetrates the case cover 6, and is rotatably supported by the cover forward shaft hole 6b of the case cover 6 via a third taper roller bearing 37d. Thus, the posterior portion of the forward transmission unit 7 with respect to the inner drum 15e, that is, the forward input gear 13 and the forward clutch 14 can be stored in the case cover 6.

Figure 5:
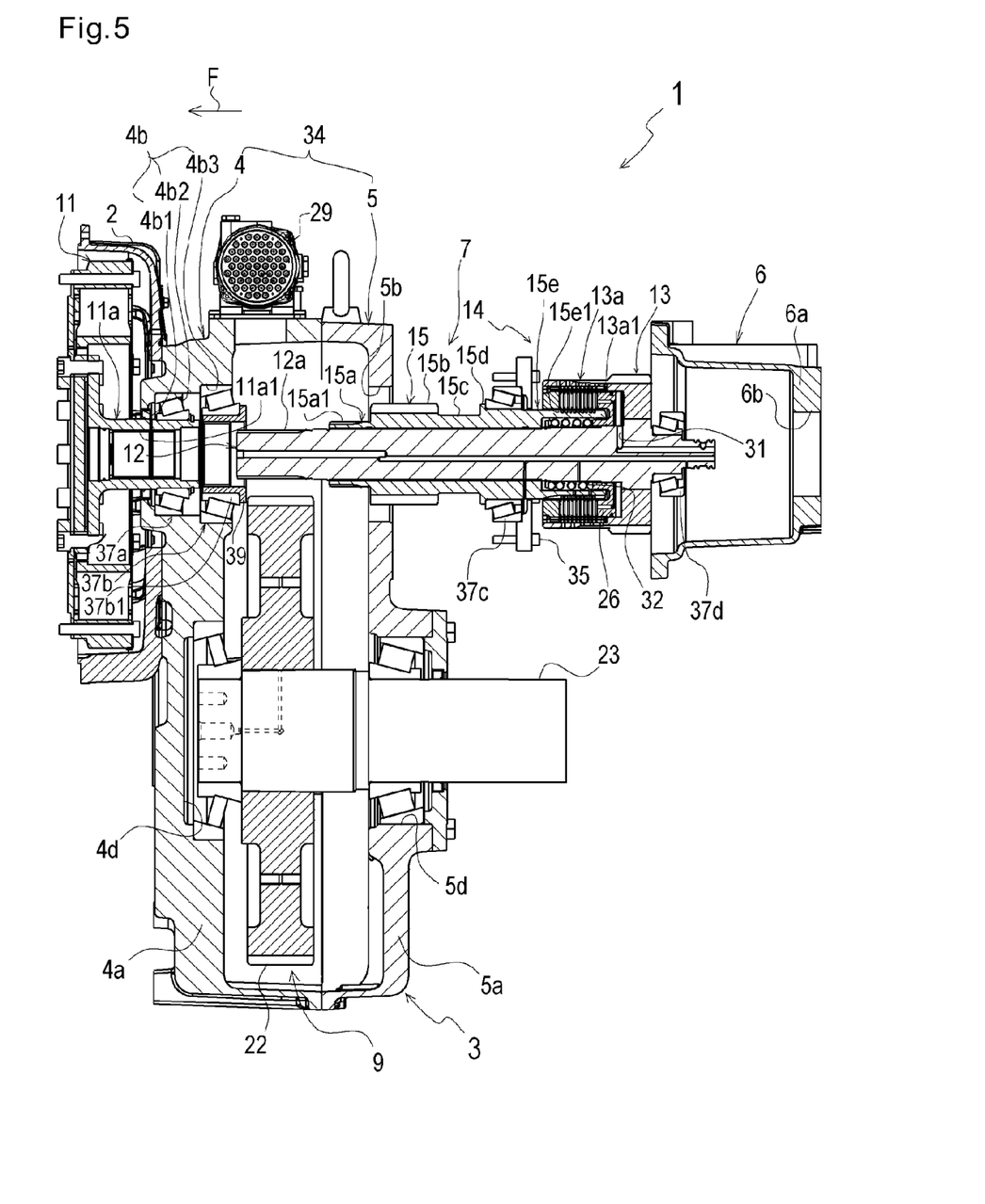
FIG. 5 is a partial cross-sectional view of the side surface of the decelerating and reversing device for marine vessels when a forward transmission unit is taken out from a housing.

The procedure of taking the forward transmission unit 7, supported in the above-mentioned manner, out of the housing 3 will be described referring to FIGS. 3 and 5. First, the bolts 41 are pulled and removed, and the cover plate 36 to which the hydraulic pump 27 and the forward-backward switching valve 28 are attached is removed from the case cover 6, and subsequently the bolts 35 are pulled and removed, and while the third taper roller bearing 37d is left on the side of the forward input shaft 12, only the case cover 6 is detached from the second case 5.

Subsequently, the back portion of the forward input shaft 12 is held and pulled out backward. Then, as described above, the sliding of the second taper roller bearing 37c in the forward direction is regulated by the collar portion 15d, so that the second taper roller bearing 37c does not remain in the second forward shaft hole 5b of the second case 5 and is taken out together with the inner drum 15e in such a manner as to be pushed backward by the collar portion 15d.

Furthermore, as described above, whereas the sleeve 39 is adhered and fixed in the first taper roller bearing 37b, the sleeve 39 and the insertion cylindrical portion 15a are constituted in such a manner as to be slidable with each other in the axial direction, so that when the back portion of the forward input shaft 12 is held and pulled out backward, the first taper roller bearing 37b remains together with the sleeve 39 in the large diameter portion 4b3 of the first forward shaft hole 4b of the first case 4, and only the insertion cylindrical portion 15a is taken out. In particular, as the present embodiment, when the spline 15a1 is formed on the outer circumferential surface of the insertion cylindrical portion 15a, frictional resistance is reduced, and the forward pinion 15 can be inserted and extracted with a small force into/from the sleeve 39.

In this case, as described above, the spline portion 12a disposed at the tip end of the forward input shaft 12 is slidably fitted and inserted in the axial direction into the spline hole 11a1 of the connecting portion 11a, so that when the back portion of the forward input shaft 12 is held and pulled out backward, only the tip end of the forward input shaft 12 is taken out from the connecting portion 11a.

Also, regarding the backward transmission unit 8, in substantially in the same way, the tip end portion of the backward input shaft 16 is relatively unrotatably fitted and slidably inserted in the axial direction into a machine-body-side taper roller bearing 38a that is disposed and fitted to the first backward shaft concave portion 4c of the first case 4.

Herein, regarding the backward pinion 19 that is freely fitted into the backward input shaft 16, an insertion cylindrical portion 19a, whose diameter is smaller than that of a tooth portion 19b, and a shaft body 19c are formed, with the tooth portion 19b sandwiched back and forth, and the inner drum 19e is contiguously disposed at the back of the shaft body 19c.

The insertion cylindrical portion 19a is rotatably supported by the large diameter portion 4c3 of the first backward shaft concave portion 4c of the first case 4 via a first taper roller bearing 38b and a sleeve 40. The sleeve 40 is also formed in a ring shape, and the outer circumferential surface of the sleeve 40 is adhered and fixed to the inner ring 38b1 of the first taper roller bearing 38b, whereas the insertion cylindrical portion 19a is relatively unrotatably fitted and slidably inserted in the axial direction into the inner circumferential surface of the sleeve 40. Then, a spline 19a1 is also provided on the outer circumferential surface of the insertion cylindrical portion 19a, thereby reducing frictional resistance in the axial direction between the outer circumferential surface of the insertion cylindrical portion 19a and the inner circumferential surface of the sleeve 40.

Furthermore, the inner drum 19e is rotatably supported by the second backward shaft hole 5c of the second case 5 via a second taper roller bearing 38c. It is noted that a collar portion 19d is provided between the shaft body 19c and the inner drum 19e.

The extended end of the backward input shaft 16 is also rotatably supported by the cover backward shaft hole 6c of the case cover 6 via a third taper roller bearing 38d. Thus, the posterior portion of the backward transmission unit 8 with respect to the inner drum 19e, that is, the backward input gear 17 and the backward clutch 18 can be stored in the case cover 6.

When the backward transmission unit 8 supported in the above-mentioned manner is taken out of the housing 3, as is the same case with the forward transmission unit 7, first, the bolts 41 are pulled and removed, and the cover plate 36 is removed from the case cover 6, and subsequently the bolts 35 are pulled and removed, and while the third taper roller bearing 38d is left on the side of the backward input shaft 16, only the case cover 6 is detached from the second case 5. Subsequently, when the back portion of the backward input shaft 16 is held and pulled out backward, the second taper roller bearing 38c does not remain in the second backward shaft hole 5c of the second case 5 and is taken out together with the inner drum 19e in such a manner as to be pushed backward by the collar portion 19d.

Furthermore, the first taper roller bearing 38b remains together with the sleeve 40 in the large diameter portion 4c3 of the first backward shaft concave portion 4c of the first case 4, and only the insertion cylindrical portion 19a is taken out.

That is, the second taper roller bearings 37c and 38c and the third taper roller bearings 37d and 38d can be taken out from the housing 3 together with the forward transmission unit 7 and the backward transmission unit 8 only by pulling out the forward input shaft 12 and the backward input shaft 16 after the detachment of the case cover 6, and it is not necessary to disassemble the entire housing 3 for maintenance of the first taper roller bearings 37b and 38b, the second taper roller bearings 37c and 38c, and the third taper roller bearings 37d and 38d, which improves maintainability. Furthermore, only the detachment of the case cover 6 allows the forward clutch 14, the backward clutch 18, the forward input gear 13, the backward input gear 17, and the third taper roller bearings 37d and 38d to be exposed to the outside, so that maintenance can be more easily performed for the forward clutch 14, the backward clutch 18, the forward input gear 13, the backward input gear 17, and the third taper roller bearings 37d and 38d, which are components of these. Additionally, load acted on the first taper roller bearings 37b and 38b, the second taper roller bearings 37c and 38c, and the third taper roller bearings 37d and 38d can be decentralized into a plurality of members made up of the first case 4, the second case 5, and the case cover 6. The first taper roller bearings 37b and 38b, the second taper roller bearings 37c and 38c, and the third taper roller bearings 37d and 38d are firmly supported, and the deviation of the rotational shaft center during rotation is reduced, so that noise and damage on the first taper roller bearings 37b and 38b, the second taper roller bearings 37c and 38c, and the third taper roller bearings 37d and 38d can be substantially restrained.

Next, the PTO transmission unit 10, which is disposed side by side with the transmission units 7 and 8 having the forward-backward switching constitution and the extraction constitution mentioned above, will be described referring to FIGS. 1, 2, and 6. The PTO transmission unit 10 is constituted by a PTO shaft 21 parallel to the forward input shaft 12 and a PTO gear 20 that is externally fitted and fixedly installed on the middle portion between the front and the back of the PTO shaft 21. The PTO gear 20 is meshed with the forward input gear 13 stored in the case cover 6 in the forward transmission unit 7, and the motive power from the engine E is transmitted to the PTO shaft 21 via the forward input shaft 12, the forward input gear 13, and the PTO gear 20, whereby the PTO shaft 21 is rotated at all times.

Figure 6:
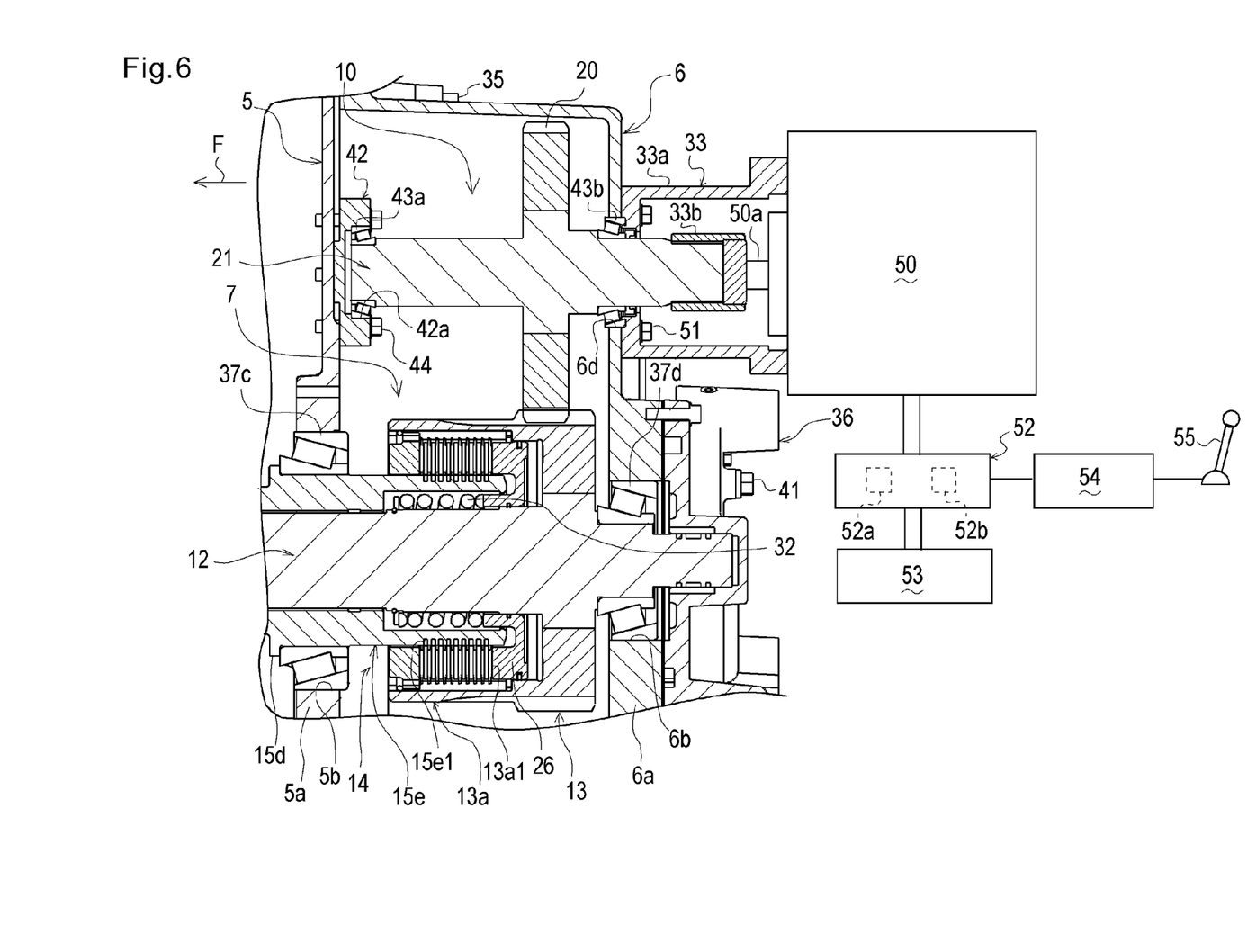
FIG. 6 is a cross-sectional view taken along the line C-C of FIG. 2 and a partial cross-sectional view of the side surface of a PTO transmission unit.

Accordingly, the PTO gear 20 and the forward input gear 13 are meshed with each other, and the forward input gear 13 and the backward input gear 17 are meshed with each other. In the case cover 6, the PTO transmission unit 10, the forward input gear 13, the forward clutch 14, the backward input gear 17, and the backward clutch 18 are adjacently disposed in a direction (hereinafter, referred to as "cover width direction") parallel to the back wall 5a of the second case 5 that fixes the case cover 6.

Herein, on the back wall 5a of the second case 5, a boss member 42 is fastened and fixed by a plurality of bolts 44 at a position obliquely downward to the right of the second forward shaft hole 5b in back view, and a PTO shaft concave portion 42a that is depressed forward is formed in the boss member 42. On the other hand, on the cover wall 6a of the case cover 6, a cover PTO shaft hole 6d is bored at positions immediately behind the PTO shaft concave portion 42a.

Then, a reduced-diameter front end portion of the PTO shaft 21 is detachably fitted and inserted into the PTO shaft concave portion 42a of the second case 5 via a front taper roller bearing 43a, and a reduced-diameter portion positioned behind the PTO gear 20 on the PTO shaft 21 is detachably fitted and inserted into the cover PTO shaft hole 6d of the case cover 6 via a back taper roller bearing 43b.

Accordingly, the PTO shaft 21 of the PTO transmission unit 10 is detachably and rotatably supported between the second case 5 and the case cover 6.

Also, the back end of the PTO shaft 21 is protruded backward from the case cover 6 and coupled with a motor generator 50 via a connecting structure 33, and the motor generator 50 is driven by the motive power from the engine E.

The connecting structure 33 is constituted by a cylindrical flange 33a and a coupling 33b that couples the back end of the PTO shaft 21 with the input-output shaft 50a of the motor generator 50 in the flange 33a.

Then, in the flange 33a, the front and back ends thereof are respectively detachably fastened and fixed on the cover wall 6a of the case cover 6 and the motor generator 50 with bolts 51 and the like. Furthermore, splines are each formed on the inner circumference of the coupling 33b and on the outer circumference of the PTO shaft 21 and the input-output shaft 50a, so that the PTO shaft 21 and the input-output shaft 50a are relatively unrotatably and slidably coupled in the axial direction with each other.

Accordingly, after the bolts 51 and the like are pulled and removed, the motor generator 50 is taken out from the flange 33a while the input-output shaft 50a is pulled out from the coupling 33b, and subsequently the flange 33a can be taken out from the case cover 6, and the coupling 33b can be pulled out from the PTO shaft 21, whereby the motor generator 50 is detachably coupled with the PTO shaft 21.

The motor generator 50 operates as an electric motor which can shift in a continuously variable manner to assist the forward power and the backward power or as a generator that generates power based on the forward power as a driving source.

Furthermore, the motor generator 50 is coupled with a power converter 52 in which an inverter unit 52a and a converter unit 52b are built in, and the power converter 52 is coupled with a battery 53 and a controller 54, and the controller 54 is coupled with an auxiliary lever 55 provided in the cab of the vessel and the like.

With this constitution, when the vessel needs to accelerate in order to reach a fishing ground in a hurry, and the auxiliary lever 55 is operated, a lever position signal is transmitted to the controller 54, and an assist signal is transmitted from the controller 54 to the power converter 52. Then, based on the assist signal, direct-current power accumulated in the battery 53 is converted into alternate-current power by means of the inverter unit 52a in the power converter 52 and subsequently supplied to the motor generator 50, and the motor generator 50 operates as an electric motor unit.

Accordingly, stepless auxiliary power from the motor generator 50 is inputted to the PTO shaft 21 via the input-output shaft 50a and transmitted to the forward transmission unit 7 via the PTO gear 20 and the forward input gear 13, or transmitted to the backward transmission unit 8 via from the forward input gear 13 to the backward input gear 17. Then, the auxiliary power is combined with the forward power or the backward power and transmitted to the output transmission unit 9 as stepless combined power, thereby increasing acceleration performance in terms of the output of the output shaft 23 of the output transmission unit 9 and reducing the output of the engine E.

Conversely, in the ordinary case, as described above, the motor generator 50 operates as a power generation unit by means of the PTO shaft 21 that rotates in all times based on a surplus of power from the engine E, and after the alternate-current power generated is converted into the direct-current power by the converter unit 52b in the power converter 52, and the direct-current power is stored in the battery 53.

With the above-mentioned constitution, when the PTO transmission unit 10 supported between the second case 5 and the case cover 6 is taken out from the housing 3, first, as described above, the motor generator 50 and the connecting structure 33 are taken out from the PTO shaft 21, and subsequently the bolts 35 are pulled and removed, and while the back taper roller bearing 43b is left on the side of the PTO shaft 21, only the case cover 6 is detached from the second case 5.

Subsequently, when the back portion of the PTO shaft 21 is held and pulled out backward, the front taper roller bearing 43a remains in the PTO shaft concave portion 42a of the boss member 42, and the back taper roller bearing 43b is taken out together with the PTO shaft 21. Accordingly, it is not necessary to disassemble the entire housing 3 for the purpose of maintenance of the front taper roller bearing 43a and the back taper roller bearing 43b, which improves maintainability.

That is, the housing 3 is formed in such a manner that the first case 4, the second case 5, and the case cover 6 which is detachable with the second case 5 are aligned in order from the front side, which is one side of the decelerating and reversing device 1 for marine vessels as a device, to the back side, which is the other side of the decelerating and reversing device 1. The forward transmission unit 7 and the backward transmission unit 8, which are forward and backward propulsion transmission units, are stored in the housing 3, regarding any of the forward transmission unit 7 and the backward transmission unit 8, with respect to the decelerating and reversing device 1 for marine vessels, which is constituted of the forward pinion 15 and the backward pinion 19 that are pinions meshed with the output gear 22 coupled with the propeller, the forward input shaft 12 and the backward input shaft 16 that are input shafts through which the forward pinion 15 and the backward pinion 19 are freely fitted in the middle of each input shaft, the forward input gear 13 and the backward input gear 17 that are input gears fixedly disposed on the back side of the forward input shaft 12 and the backward input shaft 16, and the forward clutch 14 and the backward clutch 18 that are clutches interposed in such a manner as to connect and disconnect motive power between the forward input gear 13 and the forward pinion 15 and between the backward input gear 17 and the backward pinion 19, and the forward input gear 13, the backward input gear 17, the forward clutch 14, the backward clutch 18, and the PTO transmission unit 10 for extracting power are contiguously arranged in the cover width direction in the case cover 6, and the PTO transmission unit 10 is constituted by the PTO gear 20 meshed with the forward input gear 13 and the PTO shaft 21 on which the PTO gear 20 is fixedly disposed in the middle of the shaft, and the PTO shaft 21 is detachably and rotatably supported between the second case 5 and the case cover 6, so that only the detachment of the case cover 6 allows easy access from the outside to the forward input gear 13 of the forward transmission unit 7, the backward input gear 17 of the backward transmission unit 8, the forward clutch 14, the backward clutch 18, and the PTO transmission unit 10, thereby improving maintainability and exchangeability in terms of the attachment and detachment of the forward input gear 13, the backward input gear 17, the forward clutch 14, the backward clutch 18, and the PTO transmission unit 10. Furthermore, out of the constituent components of the forward transmission unit 7 and the backward transmission unit 8, the forward clutch 14 and the backward clutch 18 that occupy a substantially large space in the housing 3 are arranged without a gap on the lateral side of the PTO transmission unit 10 in the case cover 6, thereby restraining an increase in volume of the case cover 6 due to the storage of the forward clutch 14 and the backward clutch 18, so that the volume of the first case 4 and the second case 5, which are portions made up of the housing except for the case cover 6, can be reduced by the eliminated volume of the forward clutch 14 and the backward clutch 18, and accordingly, the size of the housing 3 is reduced, thereby achieving reduction in the whole size of the decelerating and reversing device 1 for marine vessels. Additionally, the PTO shaft 21 can support the housing 3 by use of the second case 5 and the case cover 6, which are constituent members of the housing 3, so that it is not necessary to separately provide a supporting member and newly mount it in the case cover 6, whereby reduction in the component cost can be achieved, and an increase in the volume of the case cover 6 is restrained, whereby further reduction in the whole size of the decelerating and reversing device 1 for marine vessels can be achieved.

Figure 7:
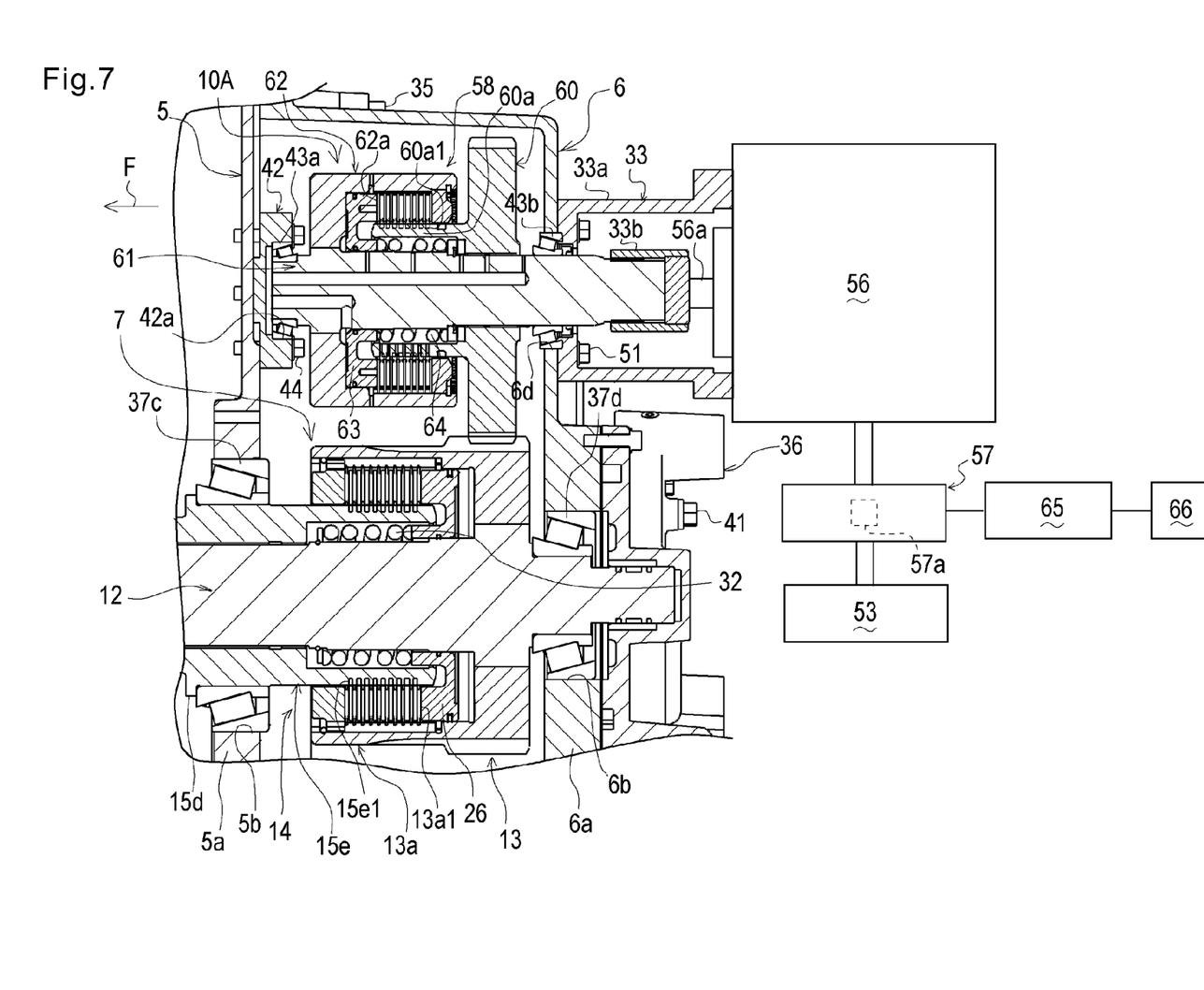
FIG. 7 is a partial cross-sectional view of the side surface of a PTO transmission unit in another form.

Next, another form of the PTO transmission unit 10 will be described referring to FIG. 7. Regarding a PTO transmission unit 10A as another form, a clutch mechanism that can connect and disconnect the motive power is interposed between the PTO gear 20 and the PTO shaft 21 in the PTO transmission unit 10 illustrated in FIG. 6, thereby achieving reduction in the power loss of engine output and the like. It is noted that features different from those of the PTO transmission unit 10 are mainly described in this section, and the same references as those used for respective elements indicate elements having the same or similar function, and duplicated descriptions for the elements, to which the same references are applied, are omitted as long as they are not necessary.

The PTO transmission unit 10A is constituted by a PTO shaft 61 parallel to the forward input shaft 12, a PTO gear 60 that is freely fitted in the middle between the front and the back of the PTO shaft 61 and meshed with the forward input gear 13 in all times, and a PTO clutch 58 interposed between the PTO gear 60 and the PTO shaft 61.

As is the same case with the clutches 14 and 18 described above, the PTO clutch 58 is also a multiplate wet clutch and includes an inner drum 60a formed in such a manner as to extend forward from the vicinity of the outer circumference of the PTO shaft 61 with respect to the PTO gear 60, and an outer drum 62 that is externally fitted and fixedly installed on the front end of the PTO shaft 61. A plurality of clutch discs 60a1 fixedly installed on the inner drum 60a are alternately disposed in gaps between a plurality of pressure plates 62a fixedly installed on the outer drum 62. Furthermore, a hydraulic piston 63 is disposed on the inner side of the outer drum 62, and a return spring 64 is wound around the outer circumference of the PTO shaft 61 in the inner drum 60a.

Accordingly, when the hydraulic piston 63 is pressed backward by the hydraulic oil, the pressure plates 62a and the clutch discs 60a1 are pressure contacted with each other against the elastic force of the return spring 64. Then, the outer drum 62 and the inner drum 60a are coupled, whereby the PTO clutch 58 is "engaged", and the PTO shaft 61 is coupled with the PTO gear 60.

Conversely, when the hydraulic oil is not supplied to the hydraulic piston 63, the hydraulic piston 63 is pressed back forward in response to the elastic force of the return spring 64, and the pressure plates 62a and the clutch discs 60a1 are detached from each other. Then, the coupling between the outer drum 62 and the inner drum 60a is severed, and the PTO clutch 58 is "disengaged", and the PTO shaft 61 is disconnected from the PTO gear 60.

That is, the motive power transmitted from the PTO gear 60, which is meshed with the forward input gear 13 and rotated in all times, to the PTO shaft 61, is freely connected and disconnected based on the engagement and disengagement of the PTO clutch 58.

Also, after being protruded backward from the case cover 6, the back end of the PTO shaft 61, which is different from the above-mentioned PTO shaft 21, is coupled with a generator 56 via the connecting structure 33, and the generator 56 is driven by the motive power from the engine E.

As described above, the connecting structure 33 is constituted by the cylindrical flange 33a and the coupling 33b that couples the back end of the PTO shaft 61 with the input shaft 56a of the generator 56 in the flange 33a, and the PTO shaft 61 and the input shaft 56a are relatively unrotatably and slidably coupled in the axial direction with each other by means of the coupling 33b.

The generator 56 generates power based on the forward power as a driving source and is coupled with a power converter 57 which has a converter unit 57a built in, and the power converter 57 is coupled with the battery 53 and a controller 65, and the controller 65 is coupled with a PTO clutch engaging-disengaging valve 66 that controls presence or absence of the supply of the hydraulic oil to the PTO clutch 58.

With this constitution, when the charge of the battery 53 is not completed, a clutch engaging signal is transmitted from the controller 65 to a solenoid of the PTO clutch engaging-disengaging valve 66, based on a charging level signal transmitted from the battery 53 via the power converter 57.

Then, the PTO clutch 58 is "engaged" based on the clutch engaging signal, and the PTO shaft 61 and the PTO gear 60 are coupled, and the motive power from the engine E is transmitted from the PTO gear 60 via the PTO shaft 61 and the input shaft 56a and inputted to the generator 56. Then, the alternate-current power generated is converted into the direct-current power by means of the converter unit 57a in the power converter 57 and subsequently stored in the battery 53.

Furthermore, when charging is progressed, and the charging of the battery 53 is completed, a clutch disengaging signal is transmitted from the controller 65 to the solenoid of the PTO clutch engaging-disengaging valve 66, based on the charging level signal transmitted from the battery 53 via the power converter 57.

Then, the PTO clutch 58 is "disengaged" based on the clutch disengaging signal, and the coupling between the PTO shaft 61 and the PTO gear 60 is severed, and the motive power from the engine E is not inputted to the generator 56.

Accordingly, notwithstanding the charging of the battery 53 is completed, the motive power from the engine E can be prevented from being consumed in a wasteful manner for the purpose of the drive of the generator 56, and the battery 53 can be prevented from being overcharged.

That is, as described above, the PTO clutch 58 that can connect and disconnect the motive power is interposed between the PTO gear 60 and the PTO shaft 61 of the PTO transmission unit 10A, so that the motive power outputted from the PTO shaft 61 to the generator 56 as the auxiliary instrument can be connected and disconnected based on the engagement and disengagement of the PTO clutch 58, and the timing of outputting the motive power to the generator 56 can be appropriately adjusted, and the improvement of fuel consumption, which is attributed to reduction in the power loss, and the improvement of the life of the generator 56 and the battery 53, which is the associated instrument of the generator 56, can be achieved.

Furthermore, the connecting structure 33 is provided on the external side surface of the case cover 6, and at least one out of the motor generator 50 that includes the electric motor unit as an assist mechanism to assist the drive of the PTO shaft 21 and the generator 56 that generates power based on the motive power from the PTO shafts 21 and 61 is detachably coupled with the external end of the PTO shafts 21 and 61 by means of the connecting structure 33, so that the PTO shafts 21 and 61 can be coupled with the assist mechanism or the generator in accordance with the specifications, and versatility of the decelerating and reversing device 1 for marine vessels can be enhanced. In particular, in the case where the assist mechanism is coupled, and the acceleration of the output from the output shaft 23 is increased, and the maneuvering performance is improved, and the output from the engine E can be reduced, so that the miniaturization and weight reduction of the engine E can be achieved.

INDUSTRIAL APPLICABILITY

The present invention can be applied to all the decelerating and reversing devices for marine vessels, wherein a first case, a second case, and a case cover detachable with the second case are aligned in order from one side to the other side of an axial direction of an input shaft with respect to the device in such a manner as to form a housing, and forward and backward propulsion transmission units are stored in the housing, and any of the propulsion transmission units comprises a pinion configured to mesh with an output gear coupled with a propeller, an input shaft configured to be freely fitted with the pinion in a middle thereof, an input gear configured to be fixedly disposed on the other side of the input shaft, and a clutch configured to be interposed between the input gear and the pinion in such a manner as to connect and disconnect motive power.

The invention claimed is:

1. A decelerating and reversing device for marine vessels, comprising:
- a first case disposed close to an engine;
- a second case disposed opposite the engine with respect to the first case, wherein the first case and the second case are joined to each other so as to constitute a case body;
- an output gear disposed in the case body so as to be coupled to a propeller;
- a case cover disposed opposite the first case with respect to the second case, wherein the case cover is detachably attached to the second case so that the case body and the case cover are joined to constitute a housing;
- an input shaft drivingly connected at one axial end portion thereof to the engine, extended through the case body, and journalled at another axial end portion thereof by the case cover attached to the second case;
- forward and backward propulsion power transmission units for transmitting power from the input shaft to the output gear,
- wherein one of the forward and backward power propulsion units includes a first input gear, a first pinion and a first clutch,
- wherein the first input gear is provided on the input shaft in the case cover so as to receive power from the input shaft,
- wherein the first pinion is provided on the input shaft rotatably relative to the input shaft, and meshes with the output gear, and
- wherein the first clutch is interposed between the first input gear and the first pinion so as to selectively make or cut off a power transmission from the first input gear to the first pinion,
- wherein another of the forward and backward propulsion power transmission units includes a second input gear, a second pinion and a second clutch,
- wherein the second input gear is disposed in the case cover and meshes with the first input gear so as to receive power from the input shaft via the first input gear,
- wherein the second pinion meshes with the output gear,
- wherein the second input gear and the second pinion have an axis parallel to the input shaft, and
- wherein the second clutch is interposed between the second input gear and the second pinion so as to selectively make or cut off a power transmission from the second input gear to the second pinion; and
- a power take-off (PTO) transmission unit for taking off power from the input shaft,
- wherein the PTO transmission unit includes a PTO shaft and a PTO gear,
- wherein the PTO shaft is extended parallel to the input shaft, is journalled at a first axial end thereof by the second case via a first bearing detachably from the second case, is journalled by the case cover via a second bearing detachably from the case cover, and projects at a second axial end thereof outward from the case cover so as to transmit power to a PTO-driven device outside of the housing,
- wherein the PTO gear is provided on the PTO shaft in the case cover between the first and second bearings, and meshes with the first input gear opposite the second input gear so as to receive power from the input shaft via the first input gear,
- whereby the PTO transmission unit and the forward and backward propulsion power transmission units are juxtaposed in the case cover in a width direction of the decelerating and reversing device, so that, by detaching the case cover from the case body, the PTO transmission unit can be exposed as being supported by the case body detachably from the case body.

2. The decelerating and reversing device for marine vessels according to claim 1,
- wherein the PTO transmission unit further includes a PTO clutch interposed between the PTO gear and the PTO shaft so as to selectively make or cut off a power transmission from the PTO gear to the PTO shaft, and
- wherein the PTO shaft is coupled at the second axial end thereof with a generator serving as the PTO-driven device in such a manner as to work together via a connecting structure detachably provided on an external side surface of the case cover, and
- wherein a control system disengages the PTO clutch when a charge of electricity to a battery which accumulates electric power from the generator is completed.

3. The decelerating and reversing device for marine vessels according to claim 1,
- wherein, after the case cover is detached from the case body, the first axial end portion of the PTO shaft can be withdrawn from the first bearing so as to detach the PTO transmission unit from the case body.

* * * * *